United States Patent [19]

Nada et al.

[11] 3,883,748

[45] May 13, 1975

[54] PHOSPHOR FOR THERMOLUMINESCENT TYPE RADIATION DOSIMETER

[75] Inventors: Naohiro Nada, Nishinomiya; Tadaoki Yamashita, Hirakata, both of Japan

[73] Assignee: Matsushita Electric Industrial Co., Ltd., Osaka, Japan

[22] Filed: Apr. 13, 1973

[21] Appl. No.: 350,728

Related U.S. Application Data

[63] Continuation of Ser. No. 96,995, Dec. 10, 1970, abandoned, which is a continuation of Ser. No. 709,757, March 1, 1968, abandoned.

[30] Foreign Application Priority Data

| | | |
|---|---|---|
| June 29, 1967 | Japan | 42-42231 |
| Dec. 28, 1967 | Japan | 42-90231 |
| Dec. 28, 1967 | Japan | 42-91231 |
| Dec. 28, 1967 | Japan | 42-92231 |

[52] U.S. Cl............................ 250/484; 252/301.4 S
[51] Int. Cl.............................................. G01t 1/11
[58] Field of Search ............... 250/484; 252/301.4 S

[56] References Cited
UNITED STATES PATENTS

| | | | |
|---|---|---|---|
| 3,141,973 | 7/1964 | Heins et al. | 250/484 |
| 3,485,766 | 12/1969 | Yamashita et al. | 252/301.4 S |

Primary Examiner—Archie R. Borchelt
Attorney, Agent, or Firm—Stevens, Davis, Miller & Mosher

[57] ABSTRACT

This has the accumulation effect of radiation energy and is mainly used as the element for thermoluminescent type radiation dosimeter. It has as the principal constituent a phosphor consisting of calcium sulfate as the principal constituent and other impurity elements such as dysprosium, thulium and the like. It is more sensitive by the order of 1-2 or more figures than the conventional ones and is excellent in the retention of absorbed radiation energy.

1 Claim, 5 Drawing Figures

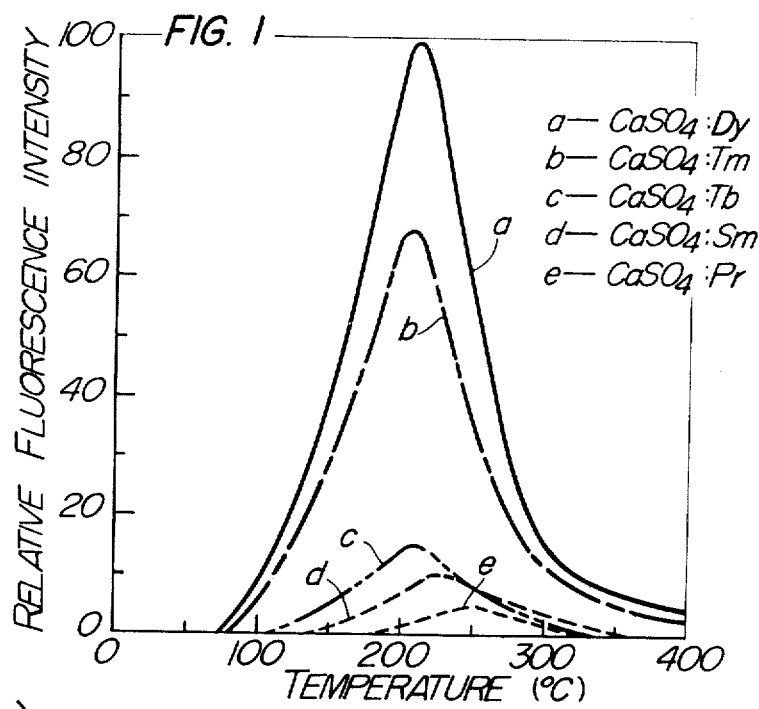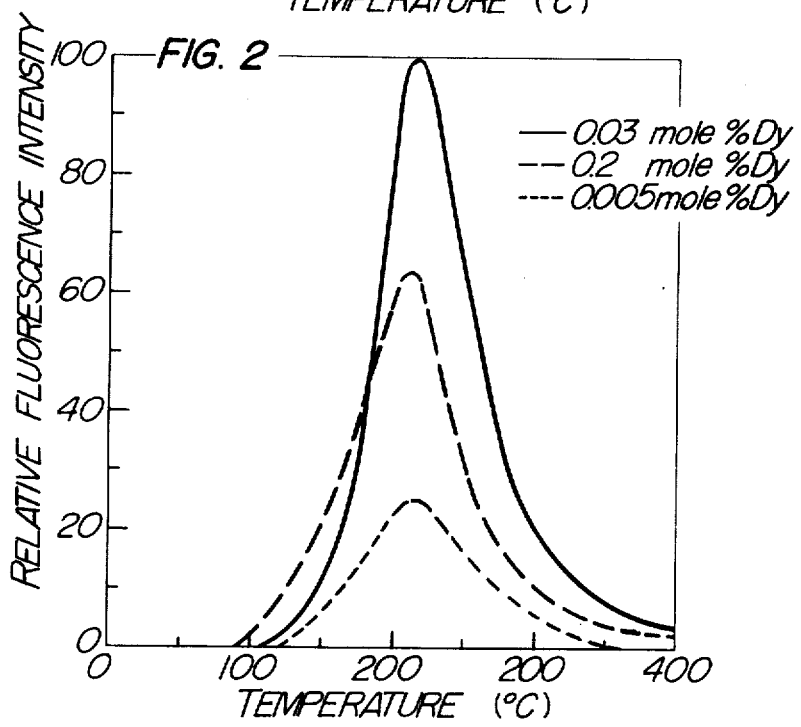

PHOSPHOR FOR THERMOLUMINESCENT TYPE RADIATION DOSIMETER

This is a continuation of application Ser. No. 96,993, filed Dec. 10, 1970 now abandoned; which is a continuation of Ser. No. 709,757, filed Mar. 1, 1968, now abandoned.

The present invention relates to a phosphor for thermoluminescence type radiation dosimeter, and the object thereof is to provide a new phosphor for dosimeter which is excellent in the sentivity to radiation and the retention of absorbed radiation energy, and is reliable and reusable.

The thermoluminescence type radiation dosimeter has recently appeared before the footlights as one of the processes for measurement of radiation dose. From several points of view, it is superior to other measuring processes, for example, according to a film badge using a photographic emulsion sensitive to radiation or a luminescent glass dosimeter. As it is especially sensitive, so it is very suitable for general applications in health physics and for measurement of very small dose. The principle of thermoluminescence type radiation dosimeter is based on the property of a certain phosphor that absorbs and preserves the energy of radiation dose. As such material re-emits in the form of light the absorbed radiation energy under heating, so said light can be measured by using an appropriate measuring device and therefore the radiation dose can be determined from the measured dose of light.

The above materials are called "thermoluminescent phosphor." When the thermoluminescent phosphor is heated at a constant rate, a relation between the emitted light and the temperature is called "glow curve." The size of glow curve corresponds to the sensitivity while the temperature at the glow peak is closely related with the retention of absorbed radiation energy. That is, the larger the glow curve, the higher the sensitivity is, while the retention is improved by increasing the glow temperature. However, the temperature at glow peak is somewhat varied depending upon the increasing rate of temperature.

The conventional phosphor for thermoluminescent type radiation dosimeter calcium fluoride added with manganese ($CaF_2$:Mn), calcium sulfate added with manganese ($CaSO_4$:Mn), and the like. $CaF_2$:Mn is so sensitive that it can measure such a low dose as about 2 mr (milli roentgen). Further, as the glow peak is present at 250°C., it is of high retention of adsorbed radiation energy and is available for repeated use. The reliability of measurement for the low dose is, however, rather low because of presence of triboluminescence.

LiF is so relatively sensitive that it is avaiable for measurement of such a low dose as about 10 mr. The number of glow peak, however, is plural, that is, the main peak exists at 210°C., being accompanied by the sub glow peaks at 105°, 150°, 185° and 260°C. While the retention of glow peak at higher temperatures is sufficient, the retention of glow peak is unsatisfactory at 100° and 150°C. Therefore, it is necessary, though disadvantageous, to employ a complicated measuring method such as a process for measuring the main glow at 210°C. but not at lower temperatures, for long time measurement of accumulated irradiation dose. Further, as it is necessary for the removing-off of accumulated energy of absorbed radiation to heat it again at 400°C. or more, the above material cannot repeatedly be used because the form of glow curve is varied by heating it at 400°C. or more.

$CaSO_4$:Mn is so remarkably sensitive that it is available for measurement of such a low dose as down to about 100 μr. The retention is, however, not sufficient because the glow peak is present at 100°C. Thus, the conventional radiation dosimeters has such merits and demerits as above, respectively.

FIG. 1 illustrates the glow curve of the phosphor for thermoluminescence type radiation dosimeter according to the present invention.

FIGS. 2 and 3 show the relations between the amount of added impurity (activator concentration) and the glow curves.

Figure 3:
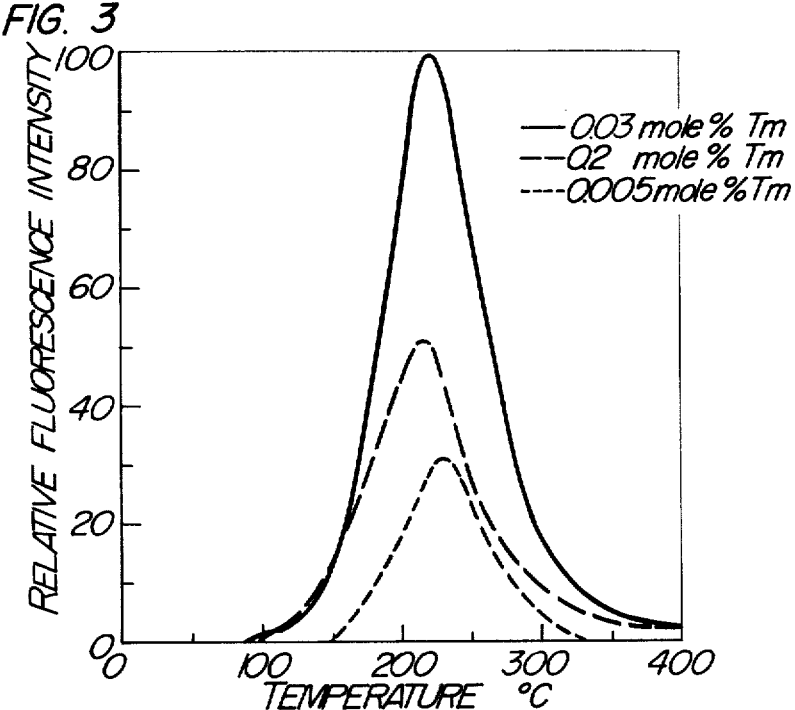

The present invention is to provide a phosphor for radiation dosimeter which is very sensitive, of high retention of absorbed radiation energy, reliable and reusable.

A phosphor for radiation dosimeter having the above characteristics according to the present invention is obtained by employing a thermoluminescent material consisting of calcium sulfate as the principal constituent. The principal material, calcium sulfate, is prepared by a quite new process and the constitution of the added impurity is new. The process of preparation, constitution, characteristics and molding process thereof are described below in detail.

First, as regards the preparation of the material, high-purity calcium sulfate ($CaSO_4 \cdot 2H_2O$), a compound of rare earth element and high-purity concentrated sulfuric acid are employed as the main starting material. Calcium sulfate is dissolved in hot concentrated sulfuric acid, to prepare the saturated solution thereof. Calcium sulfate can be dissolved by about 8 percent at most in mol ratio in hot concentrated sulfuric acid, but the widely-employed process of recrystallization due to temperature drop cannot be applied because the solubility of calcium sulfate in concentrated sulfuric acid is hardly varied by temperature change. However, when the above saturated solution is further heated until sulfuric acid is vaporized away, the crystallites of calcium sulfate begin to recrystallize. Although calcium sulfate is not thermoluminescent alone, calcium sulfate is provided with thermoluminescence by the addition of a suitable activator. The addition of the activator is carried out by dissolving the activator and calcium sulfate at the same time in hot concentrated sulfuric acid and recrystallize them. That is, a part of the activator dissolved in hot concentrated sulfuric acid is recrystallized. The segregation rate of the activator from the concentrated sulfuric acid to the calcium sulfate crystals is varied depending upon the kind, the recrystallization speed and the concentration of the activator. The ratio of the activator mol concentration for calcium sulfate in concentrated sulfuric acid to the activator mol concentration for calcium sulfate crystals is generally called "segregation constant."

In the present invention, rare earth elements were selected as the activator and 14 kinds thereof other than prometium were investigated, which were lanthanum, cerium, praseodymium, neodymium, samarium, europium, gadolinium, terbium, dysprosium, holmium, erbium, thulium, ytterbium and lutetium.

Among thermoluminescent phosphors of calcium sulfate added with such various rare earth elements as above, the addition of Tm and Dy yields the most favorable results as the dosimeter with respect to the sensitivity and the retention of absorbed radiation energy, and the addition of Tb, Sm and Pr is next favorable.

The glow curves of calcium sulfate thermoluminescent phosphors added with the above rare earth elements are as shown in FIG. 1. The temperature increasing rate of the glow curve is 30°C./min., while the addition of the activator is 1/100 mol for 1 mol calcium sulfate in the state of dissolution in hot concentrated sulfuric acid.

The calcium sulfate added with Dy ($CaSO_4$:Dy) is so exceedingly sensitive that the measurement can be made to as small dose as about 100 $\mu r$. The sensitivity thereof is somewhat varied depending upon the addition of Dy. The segregation constant of Dy is about 0.15 and, as shown in FIG. 2, the calcium sulfate is the most sensitive in a case Dy is about 0.03 mol percent in concentration in the calcium sulfate crystals. However, even if the concentration of Dy in the crystals is slightly different from the above value, the sensitivity is not so lowered as long as said concentration is confined within the range of 0.005 to 0.5 mol percent.

Further, when the sample is heated at the temperature increasing rate of 30°C./min., the glow peak of $CaSO_4$:Dy is present at 210°C. As the glow peak is positioned at such a high temperature as 210°C. but other glows are hardly present at lower temperatures, the retention of absorbed radiation energy is excellent.

Furthermore, the triboluminescence is almost absent and the stability of the material is so good that the reliability is sufficient. The accumulated energy of absorbed radiation can be removed off by heating at temperatures between 400° and 700°C. and the characteristics is not varied by said heating, so this material is available for repeated use.

The calcium sulfate added with Tm ($CaSO_4$:Tm) is the most sensitive when the concentration of Tm in the calcium sulfate crystals is about 0.03 mol percent, so the measurement can be made to as small dose as about 100 $\mu r$. However, as long as the concentration of Tm in the crystals is slightly different from said value but is confined within the range of 0.005 to 0.5 mol percent, the sensitivity thereof is not so lowered. Further, $CaSO_4$:Tm has the main glow peak at 215°C. and the very small sub glow peak at 100°C. Although the retention of glow peak at 100°C. is not good, the size thereof is as very small as 1/1000 times or less that of the glow peak at 215°C. and therefore the glow peak at 100°C. causes no trouble. As the main glow peak of $CaSO_4$:Tm is positioned at such a temperature as 215°C., the retention of accumulated energy of absorbed radiation is sufficient. In the same manner as in $CaSO_4$:Dy, it is well reliable and is available for repeated use.

A process for preparing the thermoluminescence type phosphor is described above, and the following molding process is suitable in order to use it as the element for the dose measurement.

First, in some cases, it is convenient to use the above phosphor in the form of powder. In this case, the suitable grading of powder and crystallites is 10 to 150 microns. The phosphor is prepared approximately within the above grading range by using a sieve and is used being enclosed in a capsule of polyethylene, fluorine resin or glass. When it is enclosed in a capsule of glass, it is conveniently possible to use it as it is for irradiation and measurement thereof. In this case, it is necessary to carefully select non-fluorescent glass.

Second, there is a process for molding the present phosphor with resin. In this case, the resin is required to be heat-resistant against the temperatures of 300°C. or more, to be well penetrated through by visible and ultra-violet lights and produce no fluorescence at all.

Although some of epoxy resins are of good heat-resistance, they produce fluorescence at 100°C. or more and are not suitable for this use.

Silicon resins produce no fluorescence, but have such a drawback as low viscosity at high temperatures.

Figure 4:
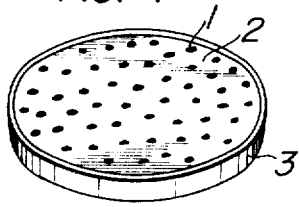

Fluorine resin is the most suitable for the present use. FIG. 4 illustrates a phosphor for thermoluminescence type radiation dosimeter molded with fluorine resin. In this figure, 1 represents the calcium sulfate phosphor containing a rare earth, 2 is fluorine resin fixing the present phosphor and 3 is an aluminum dish which prepares the form of the element and makes efficient heat transmission to the element under heating.

The suitable fluorine resin includes polytetra-fluoro-ethylene, copolymer of tetra-fluoro-ethylene and hexa-fluoro-propylene and poly-monochloro-trifluoroethylene, which are of excellent heat resistance in this order and all usable. However, for fear that they deform at high temperatures, the molding material of an aluminum dish or the like is employed as shown in FIG. 3, to prevent these resins from deforming. A few examples for the preparation of the present element are described below.

1. A process for using calcium sulfate crystallites of 0.01 to 0.3 mm in grading, well mixing almost the same amount in weight therewith of poly-hexa-fluoro-ethylene powder (Neofuron powder made by Daikin Kogyo Co.), subjecting the mixture together with an aluminum dish to cold press forming and then to heat treatment at 280° to 350°C.

2. A process, according to the above process, for using as the resin tetra-fluoro-ethylene powder (Daifuron powder made by Daikin Kogyo Co.) and carrying out heat treatment at 350° to 420°C.

The third process is a process for solidifying calcium sulfate powder, which comprises using inorganic glass as binder.

Figure 5:
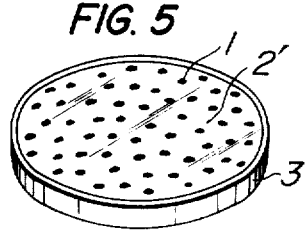

FIG. 5 illustrates a phosphor for radiation dosimeter molded with glass, wherein 1 represents the calcium sulfate phosphor containing a rare earth, 2 is glass fixing the present phosphor and 3 is an aluminum dish.

The aluminum dish is used for the same purpose as in case of using said fluorine resin, wherein it is not necessarily disadvantageous to use no said dish. However, it is more favorable to use it for strengthening and preventing glass from being fractured. In said case of preparing the element, a care should be paid to the quality of glass. Glass having the softening temperature of 700°C. or more is not available, because it injures calcium sulfate, when molded. It is necessary to employ transparent and non-fluorescent glass having the low softening temperature and working temperature. Alkali- and phosphoric acid-rich glass degradates the fluorescence of calcium sulfate at 600°C. or more. In consequence of the above limitations of glass quality, it is required to use low-melting glass of boron, zinc oxide or lead oxide, only. A few examples for the preparation of this element are described below.

1. A shallow aluminum dish of 0.2 to 0.5 mm in depth is used, lead glass and calcium sulfate are well mixed at the ratio of 1:1 in volume in said dish, and heating, dissolution and solidification are carried out for a short time. As lead absorbs radioactive rays largely, the element thereof is required to be as thin as 0.5 mm or less.

2. Lithium boride ($Li_2B_4O_7$) glass is used, therewith calcium sulfate at the ratio of 1:1 in weight is mixed well, and the mixture is subjected together with an aluminum dish to hot press forming at 500° – 600°C.

A process for preparing a novel phosphor for high-sensitivity radiation dosimeter is described above in detail.

As described above, the present phosphor is to be irradiated with radioactive rays and produce fluorescence under heating, and to inform the irradiated dose of radioactive rays from the amount of the present fluorescence. After being irradiated with radioactive rays, this element is exposed such lights as to visible and ultra-red lights, to produce fluorescence corresponding to irradiation dose. It is annotated that the irradiation dose can be determined according to this process. In this case, the sensitivity in measurement of radiation is rather low in comparison with the process for thermoluminescent type measurement, but there is such a merit as requiring no heating of the element.

The present phosphor directly relates to the measurement of the accumulated dose of radioactive rays, but the essence of the physical principle thereof is the accumulation and recording characteristics of radiation energy, so it may be said additionally that the present phosphor is possibly available not only for measurement of radioactive rays but also for other purposes, that is, as the recording element of electron beam, radioactive rays or light.

What we claim is:

1. A process for measuring radiation dose by the thermoluminescence of calcium sulfate comprising
   irradiating a thermoluminescent phosphor containing calcium sulfate as the principal constituent and an impurity element selected from the group consisting of dysprosium, thulium, terbium and praseodymium,
   heating said irradiated thermoluminescent phosphor to above the maximum glow peak temperature of said impurity element to emit light, and
   measuring the emitted light from said phosphor and determining the radiation dose therefrom.

* * * * *